Figure 2:
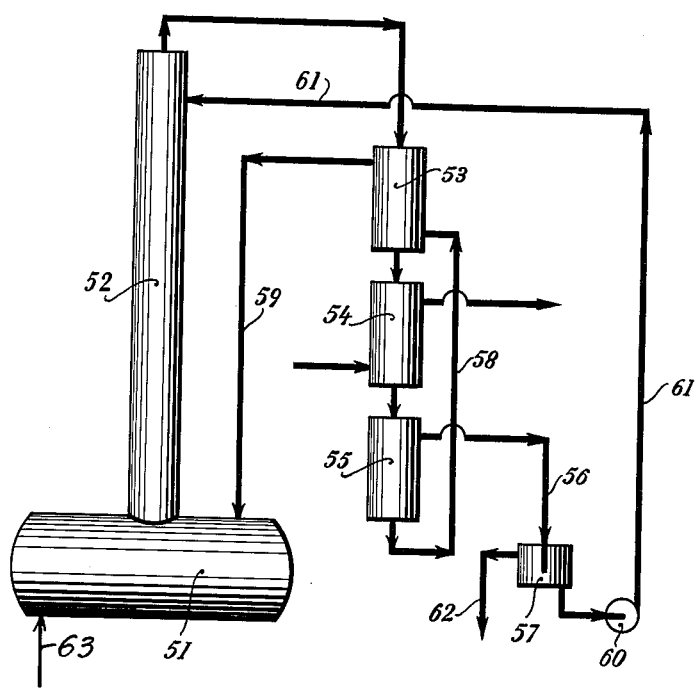

FIG. 1

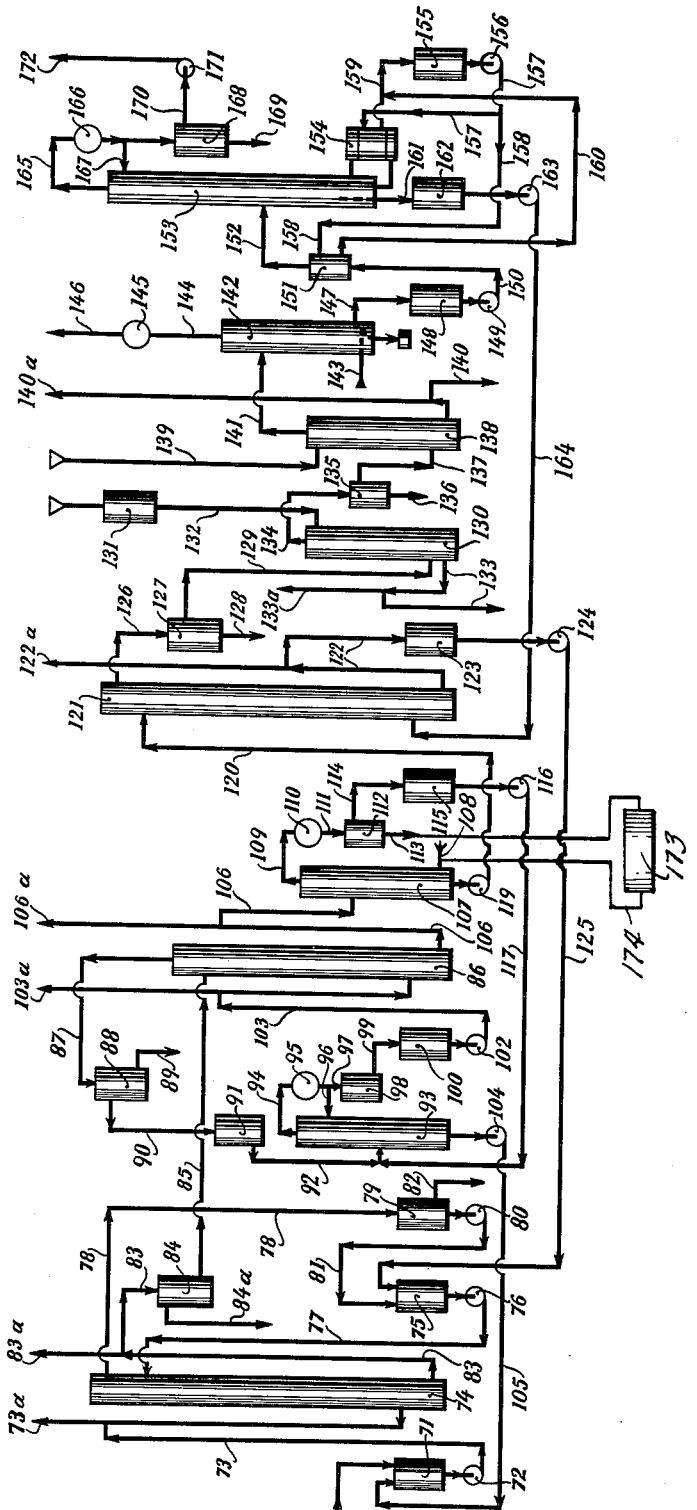

United States Patent Office 3,235,607
Patented Feb. 15, 1966

3,235,607
PROCESS FOR OBTAINING PURE PHENOLS
FROM IMPURE AQUEOUS SOLUTIONS
Helmut Fritzsche, Erlbruch, Fritz Kröger, Recklinghausen, and Karl Stein, Castrop-Rauxel, Germany, assignors to Firma Carl Still, Westphalia, Germany
Filed July 18, 1961, Ser. No. 134,554
Claims priority, application Germany, July 21, 1960,
St 16,713
5 Claims. (Cl. 260—627)

Impure aqueous solutions of phenols are produced, as is known, in coke and gas works and in carbonization plants for anthracite and brown coal. These solutions usually contain ammonium salts and free ammonia.

Impure aqueous solutions of phenols are also obtained in tar treating plants where the phenols are usually extracted from the distillation cut which boils from 175 to 208° C. and is called the carbolic oil fraction, for example, by means of an aqueous solution of sodium phenolate.

In both cases the solutions present may be contaminated by bases and so-called aromatic neutral compounds, e.g. naphthalene. In the first case, also, tar- and coal-like components, actually dissolved or suspended, accompany the valuable phenols which is desired to obtain in as pure a form as possible.

The phenols are usually extracted from the aqueous solutions by means of solvents and numerous solvents are already known, such as alcohols, esters, ethers and hydrocarbons of aromatic and aliphatic nature. Aldehyde-containing bottoms-products of the oxo-synthesis have also been proposed as solvents.

In the production of pure phenols from impure aqueous solutions by means of such extraction media there is the disadvantage that the oxo-products which contain aldehydes cause difficulties because of their tendency to form emulsions instead of extracting the phenol from waters of pH above 9. Particularly in ammonia waters which contain phenol these difficulties arise because there is a tendency for the ammonia from the water to form, with aldehydes which are in the solvent, an aldehyde-ammonia-complex. The formation of such aldehyde-ammonia-complexes is not copious because the aldehydes present in the solvent have only a negligible water solubility. These complexes are, however, the cause of the emulsifiability of the solvent in ammonia water, which is a disturbing factor in an industrial process. In the presence of alkalis which impart to the water a pH above 9, e.g., solutions of phenol in aqueous alkali, aldol-condensation of the aldehydes present in the extracting medium is favored. If subsequently, the distillative regeneration of the oxo-residue used as solvent is undertaken so that, depending on the boiling point of the oxo residue the phenols are obtained either as distillate or as a distillation residue, a crotonization of the aldols occurs, whereby an unsaturated aldehyde is obtained which forms compounds with the phenols, and thus reduces the yield of the phenols. If these high boiling products of unknown constitution are left in the extraction medium, then its efficiency on reuse for removing phenols from aqueous solution is impaired.

During this process it has been observed that the newly formed unsaturated aldehyde, particularly if its carbon chain is strongly branched, is thermally unstable, i.e. if the solvent is carefully distilled under reduced pressure, the unsaturated aldehyde splits up into cracked products which cannot be identified and these then reduce the solvent power of the extracting medium for phenols and the purity of the phenols produced.

It has now been found, that these difficulties do not arise if one uses as solvent, in an amount of 0.3 to 2 times the amount of the aqueous feed solution, either branched chain higher aliphatic alcohols with at most 20 C-atoms or mixtures containing at least 20% of such alcohols together with esters, ethers and/or hydrocarbons having a boiling range above 230° C., which solvents are obtained as primary and/or bottoms products of the oxo-synthesis after the hydrogenation step, and if the pure phenols are then obtained by driving off the solvent followed, if necessary, by rectification in the known manner.

Thus, one uses as solvents for phenols in aqueous solution of pH above 9, products of the oxo-synthesis which contain no carbonyl groups, these having been reduced to methylol groups. The hydrogenation can be effected together with that of the main oxo product or after its separation.

The hydrogenation of the bottoms products of the oxo-synthesis is preceded usually by a more or less completely hydrolyis of acetals, for instance with water.

The hydrogenation itself is carried out under conditions in which acetals are not decomposed, e.g. in the presence of a nickel catalyst at 180° C. with hydrogen at normal or increased pressure.

If, for example, an oxo-bottoms product is to be utilized as the extracting medium, which product contains thermally unstable acetals or acetals which hydrolyze in the presence of phenols and water, a preliminary treatment of the extracting medium may be necessary if hydrolytic products arise whose boiling ranges overlap those of the phenols to be produced. That is the case, for example, with bottoms products of the oxo-synthesis with diisobutylene. The isononanols and isononanals which are split off from the bottoms products boil at 180–200° C. and thereby contaminate the phenols so that they can not be purified by distillation.

The pretreatment of these bottoms products to be used as extracting media consists, according to the invention, in a distillation with dilute aqueous organic or inorganic acids or aqueous solutions of acid compounds like phenol itself, which is performed in combination with rectification through a column having an efficiency of, for example, 6 to 10 theoretical plates at normal or increased pressure whereby the dephlegmation of the head vapors is accomplished with the aid of the condensed, cooled and separated aqueous portion of the head vapors. For the purpose of maintaining at constant value the acid concentration, for example 1–20%, in the sump, this aqueous portion is preheated in this manner to 60–90° C. and recycled into the sump. In this manner the heat requirement is kept within economic limits.

The oily portion of the distillate consists of at least 90% of aldehydes and alcohols which, according to the invention may be transformed by hydrogenation and rectification into a pure alcohol fraction, so as to obtain an economically attractive embodiment which may be varied with existing market conditions.

When no more aldehydes pass over with the distillate, the necessary hydrolysis is completed and the sump product is now, after washing out the acid, suitable as extracting medium for phenol-containing waters and no longer contains any components which could prevent the production of a pure phenol fraction.

The acetal hydrolysis is a reaction which is catalyzed by hydrogen ions, as the following schematic illustration shows:

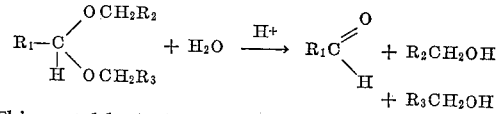

This acetal hydrolysis can therefore be increased by the presence of the acid phenols and can be prevented to a large extent by the addition of alkalis during the distillative regeneration of the extracting medium.

Accordingly the above described preliminary treatment of the solvent for separating the portions which are thermally unstable in the acid medium can be avoided according to this invention, if one adds while driving off the phenols from the solvent medium in the presence of small amounts of water, just so much alkali, for example, caustic soda, that a pH is produced in the mixture at which hydrolysis of the thermally unstable portions (acetals, esters) no longer takes place.

In the presence of 100 g. phenols (phenol and monovalent homologs of phenol) in any desired amount of solvent, additions of about 0.5 to 2.5 g. of caustic soda are sufficient to produce in the aqueous mixture a pH of 7 to 9. An ester or acetal hydrolysis could no longer be observed in this case. These amounts of alkali are so small that they retain in the solvent, even after distillative separation of the phenols, only a residual phenol content of 100 to 300 mg. per liter as nonvolatile phenolate. Subsequently the solvent thus treated, from which the phenols have been removed, is again utilized for the extraction of phenols from ammonia water so that no unfavorable results are obtained, in comparison with the addition of a phenolate-free solvent.

By means of the oxo-synthesis it is possible to obtain, for example, an octadecanol, an alcohol which contains 18 carbon atoms in the molecule, by subjecting an olefinic, aliphatic, nonbranched hydrocarbon having 17 carbon atoms in the molecule to the oxo-synthesis and subsequently hydrogenating. One obtains in this way an alcohol with a carbon chain having little branching. The corresponding olefinic feeds are obtainable, however, only with difficulty.

One can, however, also obtain an octadecanol by starting with the common diisobutylene I.

(I) 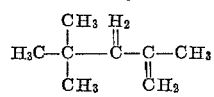

By oxo-synthesis there is produced therefrom mainly the aldehyde II.

(II) 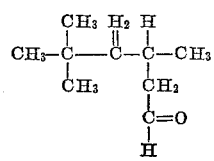

By an aldol condensation of this aldehyde there is produced the aldol III, (III) 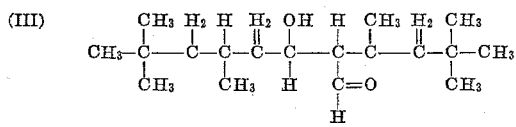

(2,2,4,8,10,10 - hexamethyl - 6 - hydroxy-7-formyl-undecane) through crotonization of which and subsequent hydrogenation a strongly branched alcohol IV having 18 carbon atoms in the molecule is produced, namely 2,2,4,8,10,10-hexamethyl-7-methylol-undecane:

(IV) 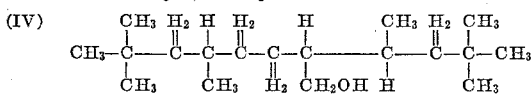

It has been found that such branched alcohols are very suitable for absorbing phenols from aqueous solutions.

Starting from tri-isobutylene V, (V) 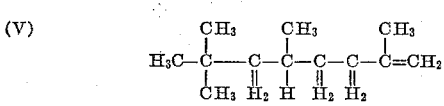

there is obtained by oxo-synthesis and subsequent hydrogenation an isotridecanol VI.

(VI) 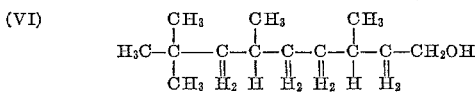

(3,6,8,8-tetramethyl-monanol-1)

This alcohol is also suitable for dephenolating waters. Its boiling point is, at normal pressure, 245°–260° C. while the above described alcohol IV boils at 280°–310° C. Thus, both products boil above the phenols to be produced. One can therefore obtain the phenols as head product during the distillative regeneration of the alcohols.

The molecular weight of the suitable alcohols is fairly limited. If one desires to obtain the phenols as head product by distillation from the alcohols, the boiling point of the solvent must be higher than that of the phenols themselves. The alcohol VI has thus approximately the lowest permissible boiling range since the phenols to be obtained boil up to about 225° C.

The upper limit of the molecular weight of alcohols to be employed is established in that the viscosity and the solidification temperatures increase with increasing molecular weight. Due to this handling and storing at normal temperature is difficult. Thus, for example, Alcohol VI has at 30° C. a viscosity of 3.68 E. while its solidifying point lies below −70° C. Alcohol IV has at 30° C. a viscosity of 38° E. and a solidifying point of −24° C. Its utilization is thus possible only at increased temperatures. Alcohols with even higher molecular weights are therefore hardly usable at all. For comparison the normal alcohols may be cited. N-tridecanol has a melting point of −30.6° C. (Alcohol VI below −70° C.) and N-octadecanol of +59° C. (Alcohol IV −24° C.). Its use for the purpose of the dephenolating process is therefore difficult if not impossible. It is, of course, apparent that alcohols obtained by other methods than oxo-synthesis and corresponding in structure to those named, are equally usable as solvents in the process of this invention.

The phenols are withdrawn from the aqueous solutions by a solvent of the mentioned type by exposing them, for instance, in liquid extraction columns to a counter current flow treatment. However, one may employ also any other extraction system in one or more stages, for example, extractors with mixing pumps and settling zones. The relative amounts of solvents and aqueous solution employed in this case may vary depending on the phenol content of the aqueous solution, the degree of purity desired for the dephenolated aqueous solutions, or other conditions, and may range from 0.3 to 2.

It has also been found that, particularly in the dephenolation of some types of ammonia-containing water in coke works, amounts of less than 0.001% of the described solvents may remain suspended if the dephenolated water is given only short settling times, of such as 1 hour, being being discharged from the system and conducted to future uses. For the complete separation of such small amounts of extracting media settling times for the water of 8 hours or more are required.

According to the invention one can circumvent these long settling times by passing the dephenolated waters through a filter whose filler material consists of granulated coke, pumice stone, silica gel, clay or such. The remaining portions of the extracting medium are completely absorbed by the filter material.

By treatment with steam or another solvent such as, for example a benzene hydrocarbon, these filters may be regenerated and from the condensate or solvent the water-insoluble extracting media may be completely recovered and recycled to the process so that a loss of valuable extracting medium is almost completely prevented.

In place of a filter one may under certain conditions, also use a centrifuge for separating the solvent residues.

The solvent residues of the dephenolated aqueous solution may, according to the invention, also be washed out by a subsequent washing with hydrocarbon fractions, for example aromatic fractions which boil between 100 and 200° C. and worked up in a known manner.

For the after-washing there are used, according to this invention, 1–4 parts per thousand of the dephenolated aqueous solution as a wash, so that the after-washing medium is conducted back each time to the after-wash subsequent to the separation of the absorbed portions of solvent etc.

At higher temperature, e.g. 40–50° C., the separation of the small amounts of solvent which have remained in suspension is usually possible by a simple separation, which may be undertaken in treating zones which are disposed behind the phenol removal process; for example in the recovery of ammonia from coke works water, where the treated waste waters which are either to be conducted to the outlet or have been discharged from it are passed at a temperature of above 80° C. to a fractionator from which the solvent portions are recycled into the dephenolating process after filtration. The dephenolated aqueous solutions thus are discharged from the dephenolated process to a further treatment, e.g. to an ammonia recovery system.

According to this invention it is preferable to operate at temperatures above 30° C. preferably above 40° C. in order to prevent insofar as possible the danger of emulsion formation.

The phenol-containing aqueous solutions from which the phenols are to be extracted are, in order to obtain a pure product, preferably subjected after the conventional filtration to a preliminary washing with small amounts of certain hydrocarbon fractions so as to extract, for example, naphthalene from the waters. As hydrocarbons which are suitable for the preliminary washing there can be employed, for example, according to the invention, aliphatic or aromatic hydrocarbons having a boiling range below 160° C. In this case the amounts which are used for the preliminary washing comprise about 1–4 volumes per thousand of the neutral or ammoniacal aqueous feed solution, or 50–200% of the alkaline aqueous feed solution which is supersaturated with phenols. According to the invention the washing medium is, in each case, suitably recycled to the preliminary washing step after distillative removal of the absorbed impurities.

Since the boiling interval of the extracting medium begins above 230° C., the following advantageous treatment of the phenol-enriched extracting medium can be undertaken according to the invention without dissolving the phenols in dilute alkalis.

The phenol-containing extracting medium is—preferably under decreased pressure—subjected to a distillation in a column which has from 6–10 theoretical plates, so that a reflux ratio of about 5–20 is maintained. At about 30 to 50 Torr, a temperature of from about 140–180° C. is established at the head of the column. There is then obtained an oily distillate which may contain, apart from some water (about 3 vol. percent of the extracting medium used), about 30–90 vol. percent phenols, depending on the boiling point of the extracting medium. The water left, which is highly phenolic, is mixed with fresh feed solution.

In order to tie up the basic components which have been absorbed and distilled over, the oily distillate portion is now washed with a slightly dilute mineral or organic acid and a little water. To 10 parts of distillate there are used, for example, 1–3 volume parts of 20% sulfuric acid and, for the after wash, 2–6 volume parts water or weak aqueous caustic soda. This washing can be carried out with various volume ratios corresponding to the accumulation of the phenols, as well as with the phenol containing extraction medium before the distillation (as shown in FIG. 1).

The extraction medium which is discharged from the residue of this effluent column still contains approximately about 20–200 mg. phenols per liter and has a discharge temperature of about 200° C. In heat exchange with phenol containing extracting medium which flows up the column, the dephenolated extraction medium is cooled to about 100–60° C. whereby the phenol-rich extraction medium flowing up the distillation column is heated to 160–180° C.

The proposed solvents do not, at normal temperature, possess a great solubility for high boiling or condensed aromatic compounds. On this account tars which are taken up into the extraction medium due to the solubility effect of the phenols are separated out again after removal of the phenols, and particularly after cooling. According to the invention the extraction medium is preferably allowed a definite settling period in a suitable zone in which it may stand from 3–10 hours. In the lowest portion of this zone the tar-like and other insoluble impurities may be withdrawn while the extraction medium is recycled to the extraction process through a pipe located at a higher level.

If the recovery of so-called higher phenols, such as those which boil at above 230° C., is not desired, and if the boiling range of the extraction medium begins slightly above 230° C. for example at 250° C., it may be advantageous to separate the extraction medium from time to time by distillation or by extraction with aqueous or solid alkalis, or by both means from the so-called higher phenols which have accumulated, before recycling the extraction medium to the extraction process.

The previously distilled phenol-rich foreproduct, which has been washed with dilute acid is now fractionated in a column having from 25–50 theoretical plates and a reflux ratio of from 2–10, whereby a product is obtained which if dissolved in 10% sodium hydroxide, leaves no measurable residue of undissolved material. It is also advantageous in this case to work with decreased pressure.

The separation of this product into carbolic acid, an o-cresol- and a m-+p-cresol-fraction, as well as a xylenol fraction, is now possible without difficulty, all the products obtained being of high purity.

Referring to the schematic diagram of FIG. 1, the operation according to the invention of such an installation is explained by way of example.

Ammonia water from coke works which has been filtered and preliminarily washed with benzene hydrocarbons, enters through conduit 1 at the top into the heat insulated extractor 2. The extraction medium is introduced through conduit 3 from below at a temperature of 30° C. The dephenolated ammonia water passes through conduit 4 into the separator 5 from which the water is withdrawn through conduit 6 or is conducted to an above described treating zone in which small residues of the extraction medium still remaining in the water may be extracted and recovered. This treating zone is not specifically shown.

The phenol-laden extraction medium leaves the extractor through conduit 7 and enters separator 8. Traces of water in the extraction medium and traces of extraction medium in the water may here be exchanged through conduits 9 and 10. By means of conduit 11 the phenol-containing extraction medium flows into the storage vessel 12. From there it goes through conduit 13 into the sulfuric acid washer 14, through conduit 15 into the water washer 16 and from there through conduit 17 into the dewatering column 18 in which substantially 1–4% of the total amount, mainly water, is evaporated. The vapors go through conduit 19 into condenser 20 and from there through conduit 21 into the separator 22. The phenol containing water moves through conduit 23 into conduit 1 and is combined there with the feed solution. The small amounts of phenol-containing oils which swim on the surface of the water pass through conduit 24 into conduit 25, which conducts the dewatered bottoms product of column 18 through heat exchanger 26 and conduit 27 into the offtake column 28. The head vapors pass through conduit 29 into the fractionating column 30 where the vapor mixture is fractionated into extraction medium and phenols. The phenol vapors pass through conduit 31 into cooler 32. By means of conduit 33 the phenols can be withdrawn for further treatment. The liquid bottoms product of column 30 leaves the column through conduit 34 and can pass through conduit 35 into conduit 25. It is then conducted again through the takeoff column 28. It may, however, also be conducted through conduit 36 to conduit 37 where it is combined with dephenolated extraction medium which leaves the bottom of column 28 through conduit 37. Finally the bottoms product may also be discharged from the system as a residue through conduit 38. In conduits 35, 36 and 38 there are provided corresponding shutoff valves 35a, 36a and 38.

The liquid bottoms from the offtake column 28 passes through conduit 37 into heat exchanger 26 and from there through conduit 39 up through the water cooler 40 and conduit 41 into the settling zone 42. Tar-like residues are removed from this zone through conduit 43. The extraction medium passes through conduit 44 into conduit 3, by means of which it is returned into the extractor. It is possible to include in the cycle of conduit 44 as above described an alkali washing zone and/or a distillation zone for the extraction medium. These zones are not shown in the drawing.

The diagram according to FIGURE 2 illustrates an arrangement for the pretreatment of an extraction medium which contains acetals decomposable under the operating conditions.

The bottoms products of an oxo-synthesis, together with dilute acid, are introduced through line 63 into the still 51 of a distillation zone. At the head of column 52 the vapors of the decomposition product and water vapor escape together. In heat exchanger 53 these vapors are condensed and the condensate is cooled in a cooler 54 by cold water. From separation vessel 55 the hydrolysis products are withdrawn through conduit 56 into a collector 57. The water is conducted through conduit 58 to the heat exchanger 53 and goes from there through conduit 59 back into distillation still 51. By means of pump 60, a portion of the hydrolysis products is returned from collector 57 through conduit 61 to the head of column 52 as reflux. Through conduit 62 the hydrolysis products produced are withdraw and hydrogenated for further use.

*Example 1*

A hydrogenated bottoms product from a diisobutylene-oxonation was already available. The product still contained acetals which tended to hydrolyze. 846 kg. of this product were introduced, together with 500 liters of 10% sulfuric acid, into a distillation system according to diagram 2, and at 10 atmospheres total pressure and 160–180° C. 226 kg. oily product was distilled off within 12 hours. Of these 226 kg. of distillate, 203 kg. consisted of isononanals and isononanols, and the rest of higher molecular products which were returned to the distillation bottoms product after rectification.

There was present 641 kg. of extraction medium which was now fitted for the removal of phenol from coke-works ammonia water.

Into an extractor as shown in FIGURE 1 were introduced 50 liter per hour of coke-works ammonia water of known composition containing 3.14 g. phenols per liter, at a temperature of 60° C., and 25 liters of oxo-bottoms products prepared as described above, at 30° C.

The ammonia water had previously been passed through a gravel filter and through a washer of the usual type in which it had been treated with 3 parts per thousand of a benzene fraction boiling between 140 and 160° C.

The ammonia water leaving the zone through conduit 6 had a residual phenol content of 12 mg./liter, as determined by its light absorption measurement at 490 m$\mu$ after mixing with p-diazoaniline. Of the extraction medium, which now contained about 6 g. phenols per liter after leaving conduit 11—referring to FIGURE 1—300 liters were introduced into a still having a column length of 2 meters, and at 20–10 Torr and a reflux ratio of about 20, about 1 liter per hour of distillate was taken off. In the beginning after about 6 liters of water had distilled over (these being returned into the feed solution to be treated) there were next obtained fractions which solidified at room temperature. After separation of the mentioned amount of water distillation continued for about 12 hours, whereupon the extraction medium in the sump analyzed 80 mg. phenols per liter, and it was allowed to cool and settle and was separated from about 0.5 kg. of tar-like residue and used again for dephenolating ammonia water. The first 4 liters of oily distillate were separately removed. They contained 58.4 volume percent phenols. The remaining 8 liters of oily distillate contained few phenols and was added to the subsequent distillation charge.

Of this fore-product containing 58.4 volume percent phenols, 16 liters were collected and after washing with dilute sulfuric acid introduced into a distillation still and rectified in a 6 meter long distillation column packed with a filler material at 30–10 Torr and a reflux ratio of about 4–10. About 500 cc. distillate per hour was taken off. There was obtained about 7 liters of distillate which, dissolved in the ratio of 1:10 in 10% sodium hydroxide, showed turbidity but no measurable separation of undissolved portions. Subsequently, fractions were obtained which were no longer completely soluble in 10% sodium hydroxide. These fractions and the distillation bottoms products were combined with the new fore-products which had been obtained in the meantime.

The fractions which are completely soluble in a 10% sodium hydroxide may be further purified by a subsequent fractionation and separated into carbolic acid, cresols and xylenols.

*Example 2*

As in Example 1, 50 liters per hour of filtered ammonia water from coke works which had been previously washed with 2 parts per thousand of a benzene fraction boiling between 140 and 160° C. were dephenolated, this water containing 3.14 g. phenols per liter, and 12.5 liters per hour of a mixture of isotridecanols, which had been obtained by the oxonation of triisobutylene and subsequent hydrogenation, was used as extraction medium. For this purpose the column used was 18 meters long, had an inner diameter of 150 mm. and was packed with Berl saddles in 12 layers, each 1.2 meters high. The dephenolated ammonia water, after discharge from separator 5, still had a residual phenol content of 18 mg. per liter. It was discharged from the phenol removal system through a conduit 6.

Of the extraction medium which was obtained from conduit 11,300 liters were introduced into the distillation still described in Example 1, and distillation took place also as described in Example 1. After about 4 liters of water had gone over 6 liters of distillate were obtained which contained 51 volume percent of phenols, as well as 12 liters containing 4.5 volume percent phenols which were admixed with enriched extraction medium which had been newly obtained in the meantime. The extraction medium which had remained as sump residue had a residual phenol content of 150 mg. per liter and was discharged, cooled and introduced into a settling tank, where 0.5 kg. of tarry materials were drawn off through a bottom valve. This extraction medium could again be used after 6 hours for phenol removing purposes.

When, after 5 cycles, the extracting medium could no longer be dephenolated in the above described manner to 150 mg. it was, after the separation of the tars, subjected to a washing process with 30 liters of a 10% sodium hydroxide and then used again for the phenol removal from ammonia water.

Of the fore-product containing 51 volume percent phenols, 18 liters were collected, washed with dilute sulfuric acid, and rectified in the same manner as described in Example 1, whereby 7.5 kg. of pure phenol fractions were obtained. The 10.5 liters of sump residues from this rectification were returned to the fore-product distillation.

*Example 3*

The procedure of this example is the same as that described in Example 1. In place of the oxo-bottoms product as extracting medium, a mixture of isooctadecanols was used. The ammonia water, which originally contained 3.14 g. phenols per liter, was dephenolated to a content of 25 mg. per liter and discharged from the system.

The extraction medium was taken off as described in Example 1. From the fore-product 69 volume percent of phenols, a pure phenol fraction was obtained by washing with dilute sulfuric acid and then rectifying.

The extraction medium still contained 60 mg. phenols per liter after preliminary distillation and after cooling and settling it was used again for phenol removing purposes.

After ten cycles the offtake of the phenols from the extraction medium was continued until reaching a head temperature of 300° C. (converted to normal pressure) and the distillation fractions thereby obtained, which contained less than 25 volume percent phenol and made up about 3% of the total charge of extraction medium, were subjected to a washing with 10 volume percent (with reference to the distillate) of 10% sodium hydroxide and then again mixed with the main portion of the extraction medium obtained in the sump of the offtake column, which had been cooled and settled out, whereupon it was recycled for removing phenols from ammonia water.

*Example 4*

An example of the extraction of the phenols, according to the invention, from an aqueous alkaline sodium phenolate liquor supersaturated with phenols, the non-chemically bound phenols of which were absorbed from a tar oil fraction, is shown in the diagram of FIGURE 3.

From storage container 71 the carbolic oil, which is preheated to 60–70° C. is conducted by means of pump 72 up conduit 73 having an aerator 73a into the bottom of the tar oil dephenolating column 74. At the same time phenolate liquor which is heated to the same temperature and which contains stoichiometric quantities of sodium hydroxide and phenols is introduced from storage container 75 by means of pump 76 up conduit 77 into the top of the tar oil dephenolating column 74. On its way to the top the carbolic oil releases its phenols to the phenolate liquor which sinks to the bottom. The carbolic oil, freed of phenol, collects at the top in the separation chamber of column 74 and flows through conduit 78 into a separation tank 79. Here any phenolate liquor which has been carried along is separated and is returned by means of pump 80 and conduit 81 into the phenolate liquor vessel 75.

The remaining oil is discharged through conduit 82 from separator 79. The phenolate liquor, which now contains phenols in greater than the stoichiometric amount, is discharged at the bottom from tar oil column 74 and is conducted through conduit 83 having aerating means 83a to a separation vessel 84 in which any carbolic oil carried along is separated and returned through conduit 84a. The phenolate liquor, which is supersaturated with phenols, enters then through conduit 85 into the top of the gasoline wash column 86. The natural oil portions which are dissolved in addition to the excess phenol are washed out with gasoline in counter current flow at 50–60° C.

The charged gasoline collects at the top of column 86 and is passed through a conduit 87 over a water separator 88 from which the water is discharged through conduit 89 and through a conduit 90 into an intermediate zone 91.

From there the charged gasoline is conducted along conduit 92 into the gasoline distilling column 93, where it is freed of neutral oil and conducted over head through conduit 94 into a condenser 95.

A portion of the condensate is returned through conduit 96 to the head of the column, while the washing gasoline present in the circuit is conducted through conduit 97 over a cooler 98 and conduit 99 into an intermediate zone 100. From the latter the washing gasoline is conducted by means of pump 102 and conduit 103 having aerating means 103a to the bottom of the gasoline washing column 86.

The neutral oils separated from the gasoline, including a residual phenol content, are returned by means of pump 104 and conduit 105 into container 71 for feed oil.

The phenolate liquor which has been washed with gasoline collects at the bottom in the gasoline wash column 86 and is conducted over conduit 106 having aerating means 106a to the steam stripper 107, where by means of counter current steam stripping, the dissolved gasoline portions are separated through conduit 108.

The water-containing gasoline vapors pass through conduit 109 into condenser 110 and over conduit 111 into separator 112. The water is withdrawn from separator 112 through conduit 113.

The separated gasoline is conducted over conduit 114 into an intermediate zone 115. From this zone it is returned by means of a pump 116 and through conduit 117 into column 93 where it is treated together with the main portion of the gasoline.

The aqueous condensate which is taken off through conduit 113 is best used for producing the steam for the steam stripper 107 so that the phenols still contained in the aqueous condensate are recycled. Consequently, the aqueous phenol-containing condensate is vaporized and the phenol-containing vapors arrive by means of conduits 174 and 108 into the steam stripper 107. Through the free end of conduit 108 fresh vapor may be added, if necessary.

The aqueous condensate could, however, just as well be introduced into a water dephenolating system. It may also be used to cover any occurring losses of phenolate liquor.

The phenolate liquor which is super-saturated with phenols is now so clear that it does not become turbid even by the addition of excess soda lye or upon subsequent extensive dilution with distilled water. This is conducted from the bottom of column 107 by means of pump 119 through conduit 120 to the top of the extraction column 121 where it is extracted, according to the invention, at about 70° C. by means of isooctadecanol in counter current.

Phenolate liquor which contains stoichiometric amounts or almost stoichiometric amounts of alkalis and phenols leaves the column at the bottom through conduit 122 having aerating means 122a and is collected in a separating vessel 123 where residues of isooctadecanol form a cream, and this is returned into the process.

From this separating vessel the phenolate liquor is returned through pump 124 and conduit 125 into the storage container 75 and thus back to the process.

The extracted phenols are now dissolved in the solvent which has collected at the top of the extraction column 121. It is withdrawn through conduit 126 into an intermediate zone 127, in which small amounts of water are settled out and can be withdrawn through conduit 128. In order to wash out the basic substances the solvent is conducted from there through conduit 129 into the sulfuric acid wash column 130. To this column sulfuric acid is conducted from storage container 131 through conduit 132 and enters at the top, while the sulfuric acid carrying the basic substances is withdrawn at the bottom of column 130 through conduit 133 and suitably treated.

The solution, which is freed of basic substances, is now conducted through conduit 134 into an intermediate zone 135, the lower layer of which may be removed through conduit 136.

The solution is then conducted through conduit 137 into the water washing column 138 at the bottom and fresh wash water or dilute aqueous sodium hydroxide is introduced at the top through conduit 139.

The wash water laden with acid residue is withdrawn at the bottom through conduit 140 having aerating means 140a while the extraction product which is now completely washed is conducted through conduit 141 to a water removing column 142 which is indirectly heated at the bottom by means of a steam coil 143.

The water vapors are withdrawn from the head of column 142 through conduit 144 and deposited in condenser 145. Through conduit 146 the cooled condensate thus obtained is conducted to any desired treatment process.

The dewatered extraction product is conducted through conduit 147 from the bottoms of column 142 into an intermediate zone 148. From this it is conducted by means of a pump 149 through a conduit 150 and a heater 151 as well as conduit 152 to a rectification column 153.

The rectification column has a sump circulating heater 154 which is heated by means of a circulating pump 156 through a conduit 157 by oil from the oil heater 155.

Another portion of the heated oil is conducted through conduit 158 to the heater 151 mentioned above. The oil which is cooled in heaters 151 and 154 is returned through conduit 159 or 160 into the oil heater 155. The sump product of the rectification column 153, freed of phenols, is conducted through conduit 161 into an intermediate zone 162. From there it is returned by means of pump 163 and conduit 164 into the bottom of the extraction column 121, to be used again as an extracting medium.

From the head of column 153 the phenol vapors are conducted through conduit 165 into a condenser 166. The condensate is returned partly as a reflux through conduit 167 to the head of column 153 and is conducted over terminal cooler 168 and conduit 169 into a suitable storage tank. A vacuum pump 171 is connected to the terminal cooler 168 through a conduit 170 through which the separated noncondensable gases are discharged to the atmosphere through conduit 172.

In order to perform the process according to the invention the ratios and the working conditions indicated hereafter may be used as an example.

Through conduit 73 are introduced into the extraction column 53 3.4 kg. per hour of a tar-oil fraction preheated to 70° C. and boiling between 180° and 210° C., which fraction contains 34% phenols.

Through conduit 77 are introduced into the extraction column 74 in countercurrent flow 20.5 liters per hour of a sodium phenolate solution also preheated to 70° C. which contains 94 g. caustic soda and 249 g. phenols per liter.

The dephenolated tar-oil fraction is discharged from the installation through conduit 82.

The phenolate liquor which is charged with the extracted phenols is washed out in the extraction column 86 with 8 liters of a gasoline fraction which boils between 100 and 140° C. so as to remove any neutral oils which have also been dissolved. The gasoline is then regenerated and the phenolated liquor is treated in the steam stripper column 107 with 1.5 kg. saturated steam at 105° C.

From there the phenolate liquor is conducted into the extraction column 121 where the excess phenols extracted from the tar-oil are taken out of it with 7 liters of isooctadecanol at 50–70° C. It is returned then through container 123 into the charge.

The isooctadecanol at 50–60° C. is now conducted through zone 127 from below into the sulfuric acid washing column 130 into the top of which 1 liter of a 20% acid is introduced and is then conducted into the bottom of the after-washing column 138 into the top of which 1 liter of water or of a 10% aqueous sodium hydroxide solution are introduced.

This washing is performed at about 50° C. The isooctadecanol, which is laden with phenols, is then conducted into the dewatering column 142 in the sump of which the charged solvent is heated to about 160° C. and from the heat of which about 50–100 cc. of aqueous condensate are removed hourly.

From the sump of the dewatering column 142 the dewatered phenol-containing solvent is conducted through container 148 and heater 151 into the rectification column 153 which has a temperature of 155° C. and a pressure of 9–6 Torr. in the sump. From the sump of column 153 the solvent, which has a phenol content below 1%, is conducted into the preliminary zone 162 and is recycled from there into the process. At the head of column 153, 1.1 kg. phenols are withdrawn each hour at about 60° C. and 2–4 Torr., these phenols being completely free or neutral oils or any other undesirable accompanying substances.

What is claimed is:

1. A process for recovering pure phenols from their aqueous neutral to alkaline solutions comprising the steps of extracting the phenols with a solvent comprising at least 20% by volume of branched chain higher aliphatic alcohols having from 13 to 20 carbon atoms per molecule and boiling above 245° C. in an amount from 0.3 to 2 times that of the aqueous feed solution, the solvent having a composition corresponding to that of a substance selected from the group consisting of hydrogenated primary products of oxo-synthesis and hydrogenated oxo bottoms, and then distilling the extract to remove the solvent, and recovering pure phenols.

2. A process as recited in claim 1 in which the material treated in an aqueous solution supersaturated with phenol.

3. A process as recited in claim 1 in which the solvent, after removal from the phenol extract is cooled to 30–60° C. and treated in a settling tank to remove tarry impurities whereupon it is recycled to the extraction step.

4. A process for recovering pure phenols from aqueous solutions having a pH in excess of 9 comprising the steps of contacting and mixing said aqueous phenol containing solution with a branched chain higher aliphatic alcohol being substantially free of carbonyl groups, and having from 13 to 18 carbon atoms in the chain and boiling at a temperature higher than said phenol and above 225° C., in an amount from 0.3 to 2 times that of the aqueous feed solution, recovering a phenol-rich extractant solution, removing phenols from the extractant, and recycling the extractant to the extraction zone.

5. A process for recovering phenols from a sodium phenolate liquor comprising contacting and mixing a sodium phenolate liquor containing a stoichiometric excess of phenol with a branched chain alcohol being substantially free of carbonyl groups, and boiling at a temperature higher than said phenol and above 245° C. and recovering a phenol rich alcohol extractant solution, separating the alcohol from the phenols and recovering pure phenols.

References Cited by the Examiner

UNITED STATES PATENTS 1,986,320   1/1935   Burdick _____ 260—627
2,683,752   7/1954   Stanley, et al. _____ 260—627

OTHER REFERENCES

"Higher Oxo Alcohols," page 21–25, 32, pub. by Enjay Co., Inc., 15 W. 51st St., New York 19, N.Y. (1957).

LEON ZITVER, *Primary Examiner.*

CHARLES B. PARKER, HAROLD G. MOORE,
*Examiners.*

J. E. EVANS, *Assistant Examiner.*